United States Patent

[11] 3,594,722

[72] Inventor William F. Shultz
 P.O. Box 55, Gotha, Fla. 32734
[21] Appl. No. 777,595
[22] Filed Nov. 21, 1968
[45] Patented July 20, 1971

[54] SIGNALING APPARATUS
 9 Claims, 5 Drawing Figs.
[52] U.S. Cl. .................................................. 340/59,
 340/242, 200/84
[51] Int. Cl. .................................................... B60t 17/22,
 G01f 23/08
[50] Field of Search ............................................ 340/60, 59,
 242

[56] References Cited
UNITED STATES PATENTS
3,350,704 10/1967 Kessler .......................... 340/242

Primary Examiner—John W. Caldwell
Assistant Examiner—Howard Cohen
Attorney—Duckworth and Hobby ABSTRACT: A safety warning apparatus for signaling when vehicle fluids, such as brake and power steering fluids are low. The system operates off of the manifold vacuum and may operate audibly as well as visually to alert the operator of potential hazards and may also be adapted to activate the brake lights when the vehicle stalls.

PATENTED JUL 20 1971

INVENTOR
William F. Schultz

BY Duckworth and Hobby

ATTORNEYS

INVENTOR
William F. Schultz

BY Duckworth and Hobby
ATTORNEYS

SIGNALING APPARATUS

BACKGROUND OF THE INVENTION

1. Field of the Invention

The present invention relates to a signaling system to warn the operator of a vehicle, such as automobiles and trucks, when fluid reservoirs in the vehicle are reaching a low level. More specifically the present invention is specifically adapted to warn the driver of a vehicle when his brake or power steering fluid is low, so as to avoid the hazard of having the brakes and power steering suddenly becoming inoperable for lack of sufficient fluids in the reservoirs. The present invention may be operated singly, such as in the brake fluid reservoir of the hydraulic brake system or may be worked in series so that a warning signal indicates a low level in one of several such fluid reservoirs. Motor vehicles in general use today, generally have several fluid systems, in each of which it would be desirable to have some kind of indicator to tell when the fluid level is low. This is especially true when the fluid level of hydraulically operated braking and power steering systems are involved. In the hydraulically operated braking systems in motor vehicles there is generally provided a single or dual master cylinder adapted to contain a supply of brake fluid to operate the brakes of the vehicle which are located in the wheels. The loss of brake fluid occurs from several causes and may result in failure of the braking system or a portion thereof and thus may result in serious accidents. Loss of brake or power steering fluid can result from small leaks in the flexible hoses leading to the wheel or to the steering system, or from leaks in any part of the lines, fittings or seals in power steering systems. Loss of these fluids may be small and go unnoticed until the fluid reservoirs are checked or until they are completely depleted in which case the systems may become inoperative very suddenly.

2. Description of the Prior Art

In the past a great many devices have been proposed to warn drivers of the ever present danger of the loss of brake or other fluids in hydraulically operated systems. These Prior Art Devices frequently use some type of float in the reservoir so that when the fluid level reaches a predetermined low level an electrically operated switch is activated to actuate a warning light. In some cases the switches have been completely sealed liquid mercury switches to avoid the danger of sparks setting fire to flammable liquids or gases. One such device has been adapted for use with hydraulic brake systems and another such device has been used for fermentation and food processing operations where precautions are observed to avoid contamination of liquid food. This latter device employs the circuit maker and breaker in a well known liquid mercury switch with a switch placed on a float that floats in the reservoir so that when the float arm reaches a certain angle, the mercury switch is activated and an alarm is set off. The switch may be used to turn a pump on or off to maintain a desired fluid level. Other float actuated warning systems have used open switches or switches placed outside of the reservoir to avoid igniting flammable fluid or vapor therein. However, none of these Prior Art Devices have come into general use and none provide a general nonelectrical switching system, nor do they provide series operated devices to provide warnings of several devices including power steering system.

SUMMARY OF THE INVENTION

The present invention relates to hydraulic brake and power steering fluid safety signal systems and especially to warning systems designed for rough service in both new and old cars, trucks, buses, and the like. It is operated by a vacuum from an internal combustion engine with a hose or tubing connected to the manifold vacuum. The signal is controlled by the rise and fall of the fluid which, in turn, controls a float housed in a guide tube. The tube with the float therein may be placed into a fluid reserve container. The float is connected by a link to a vacuum control valve, which controls the vacuum which operates the signal. As the fluid container is filled the control float rises and closes the valve preventing operation of the signal. When the fluid in the reserve container reaches a predetermined low point, the control float drops and opens the valve, to activate the signal and warn the driver that the brake or power steering fluid is low. This signal system replaces the original cover or cap and can be installed in minutes by connecting a line to the manifold vacuum of an internal combustion engine. A vacuum-operated electrical switch is also provided which may operate a visual warning system and may also be adapted to operate the vehicle braking lights when the vehicle stalls.

BRIEF DESCRIPTION OF THE DRAWINGS

Other objects, features and advantages of this invention will be apparent from a study of the written description and the drawings in which.

DESCRIPTION OF THE PREFERRED EMBODIMENTS

Figure 1:
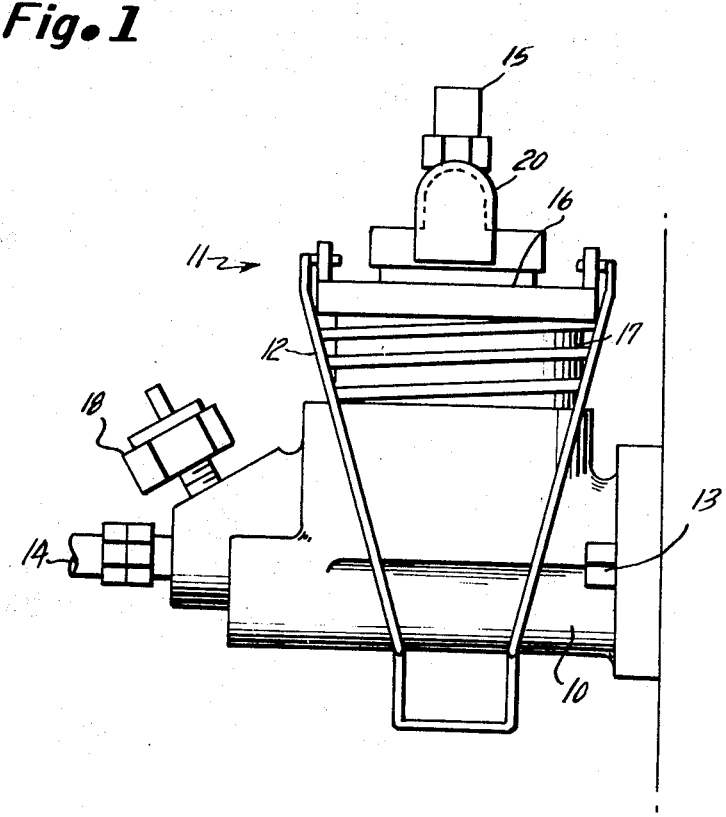
FIG. 1 is a side view of the hydraulic brake cylinder with one embodiment of the present invention shown attached thereto.

FIG. 1 shows a side view of a master brake cylinder 10 having the present invention attached thereto indicated at 11 and removably attached to the cylinder 10 by snap connector 12. The master cylinder 10 is held to the vehicle by bolts 13 and has brake lines 14 leading from the cylinder 10 to wheel cylinders located in the wheels of the vehicle. The upper portion of the master cylinder 10 acts as a reservoir for brake fluid used in the braking system and the present invention 11 may be added to the system by removing the cap from the master cylinder 10 and replacing it with the invention 11 and then connecting a vacuum line 15 to the intake manifold. Cap portion 16 replaces the cap normally on the master brake cylinder 10, which in the illustrated model has threads 17 for holding the old cap, which threads are not used when the cap is replaced with the invention 11.

Figure 2:
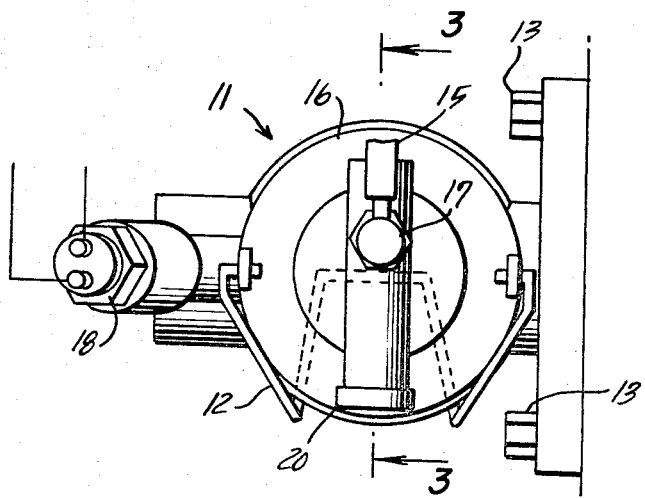
FIG. 2 is a top view of FIG. 1.

Referring now to FIG. 2 the top view of FIG. 1 is seen having capped portion 16, vacuum line 15, snap holder 12, bolts 13 and vacuum line connector 17. A switch 18 is used to activate the brake or stop lights on the vehicle and is activated by the fluid pressure in the master cylinder. A cover portion 20 is used when a signal device, such as a whistle, is located within the apparatus 11. Where the signal device is to be located elsewhere, such as the dashboard of a vehicle, this cover can be removed, a pipeline attached and running to the dashboard.

Figure 3:
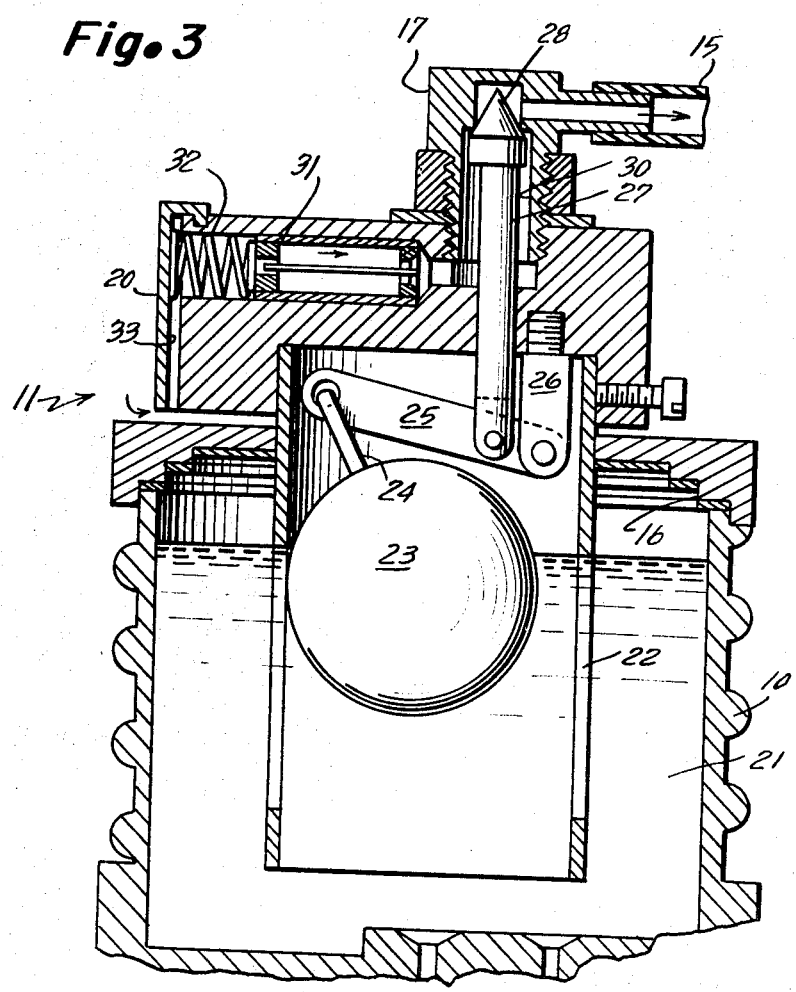
FIG. 3 is cutaway of FIG. 2 taken along line 3—3 of FIGS. 2 and shown the internal operation of the invention.

Reference is now made to FIG. 3, which shows a cutaway view of the embodiment of FIG. 1 and 2 taken along line 3—3 of FIG. 2. The hydraulic brake fluid reservoir of the master cylinder 10 may be seen with brake fluid 21 therein and with the capped portion 16 of the present invention shown replacing the normal cap on the master cylinder 10. It should be noted that cap 16 has a stepped or multiple grooves thereon which adapts the cap to fit different makes and models of master brake cylinders, thereby avoiding the necessity of having different models for each of the various types of master brake cylinders 10. The vacuum line 15 and connector 17, as well as the cover 20 may also be seen in this view. Tube guide 22 is connected to the apparatus 10 for guiding float 23, which float has a support rod 24 connected to a lever arm 25. Cap 16 is placed on the brake cylinder 10, with tube 22 extending down into the brake fluid in the reservoir to guide the float 23 as it moves up and down with the level of the brake fluid 21.

Float 23 may be made of cork or any other substance that will float in hydraulic brake fluid and not be chemically damaged thereby. The rising and falling of float 23 moves arm 25 which is movable connected to member 26 which member is fixedly attached to apparatus 11. A needle valve 27 is movably connected to arm 25 between the movable connections for support rod 24 and member 26 so that the needle valve 27 will rise and fall with the movement of the float 23. Needle valve 27 has a square valve guide for vacuum passage and guide head 28 which fits into connector 17 to seal the vacuum in vacuum line 15. As the float 23 drops with the brake fluid level, the arm 25 and needle valve 27 also drop until the head 28 of needle valve 27 leaves an opening between connector 17 and head 28, thereby opening the vacuum line into a chamber 30. Chamber 30 is connected to a sound alarm or signal 31 held in apparatus 11 by a spring 32 and cover 20, which cover also has a vacuum bypass way 33 to allow the entrance of outside air. The air passing through the alarm 31, which may be a whistle, or the like, gives off an audible warning. However, as can clearly be seen an air tight pipe line could be connected in apparatus 11 at the location of spring 32 and cover 20 and the alarm placed at any other location of the vehicle, such as on the dashboard. It should be noted also at this point that support rod 24 can be varied in length so that the signal can be activated at any desired predetermined point of the level of brake fluid 21.

Figure 4:
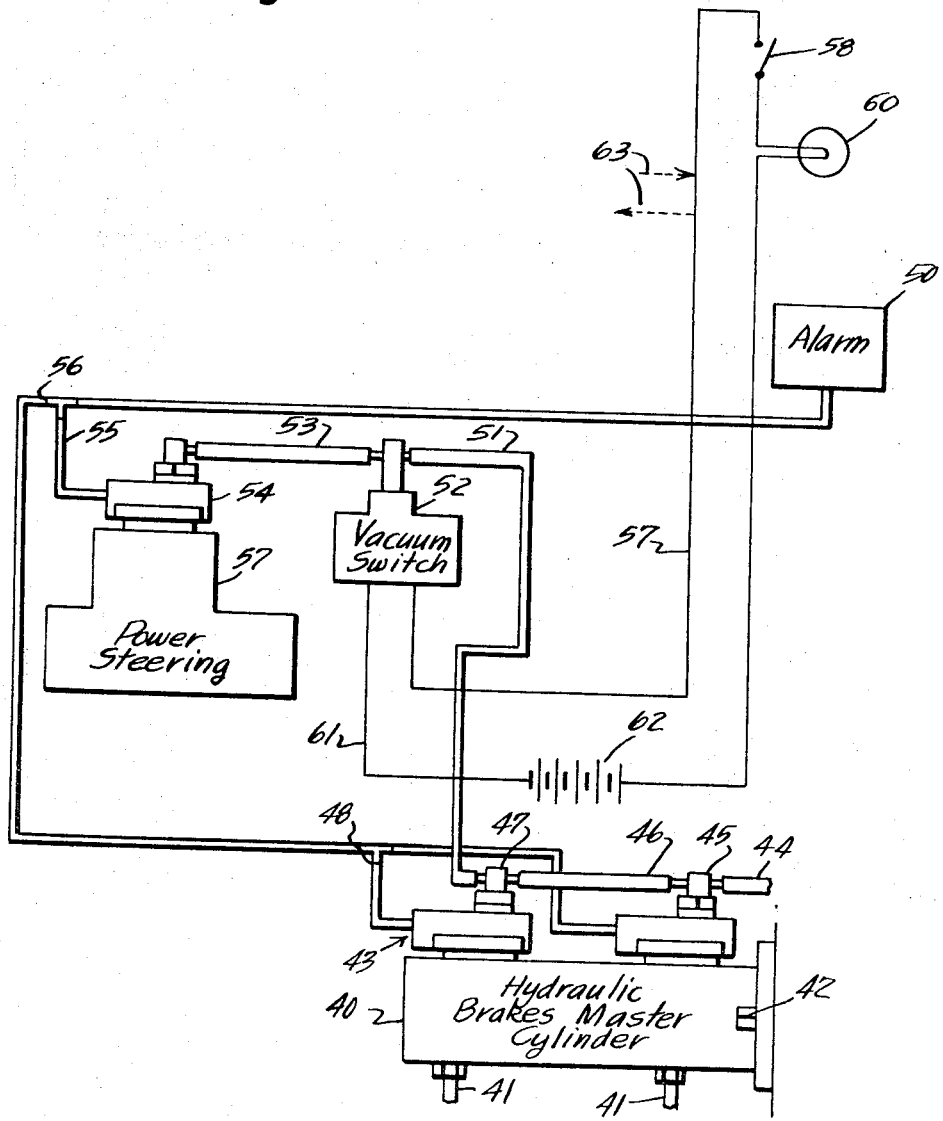
FIG. 4 shown an embodiment having a dual action hydraulic brake system connected in series with the power steering system and having both a sound alarm system and a warning light.

Turning now to FIG. 4, a preferred system of my invention is there shown for use with dual action brake cylinders and power steering in series and having both a warning light and an audible alarm system, both of which are located in the driver's compartment of the vehicle. Dual action hydraulic brake master cylinder 40 is shown having two brake lines 41 connected thereto, and the cylinder being held to the vehicle by bolts 42. The brake cylinder cap 43 operates in the same manner as that in the embodiment of FIGS. 1, 2 and 3, except that two such systems including two floats, guide tubes, etc. are combined into one cap for the dual action brake system. Vacuum line 44 to manifold vacuum enters one of these T-Fitting connectors 45 where the pipe line connects the connector 45 with connector 47. The location of the audible alarm in the previous system has a pipe connection fitting in each of the two combined caps with both of these tubes being joined together at 48 and connected to the sound alarm 50, which may be located in the driver's compartment of the vehicle. The vacuum line connector 47 also has a connection for a pipe 51 connected to a vacuum switch 52, which in turn, has a vacuum line 53 also connected thereto and running to a power steering cap 54, which may also be identical to the embodiment of FIGS. 1, 2 and 3, except adapted to the power steering fluid reservoir which normally require a different cap, a deeper guide tube, and a longer arm for the float. The location of the audible alarm in the previous system is replaced by a connector for a tube 55 which in turn is connected at 56 to the tubes from the joint 48 to the alarm 50. A power steering fluid reservoir is indicated at 57 and the apparatus 54 is connected thereto. As can be seen at this point, if either of the floats in the hydraulic brake master cylinder 40 drops too low, or if the float in power steering reservoir 57 drops too low, air will be allowed into the vacuum lines through the alarm 50, thereby sounding the alarm that one of the fluid reservoirs has reached a predetermined low level and has become a safety hazard.

Looking now at vacuum switch 52, a vacuum-operated switch having a diaphragm operated by a vacuum from vacuum line 51, is located therein. Switch contacts are pulled apart by the vacuum acting on the diaphragm and upon release of the vacuum the contact points come together by the spring pressure on the diaphragm A wire 57 runs from one contact of the switch through the vehicle ignition 58 and through a warning light or signal 60, while a second wire 61 runs to the battery 62, which is connected to warning light 60, to form a complete circuit. The warning light will come on whenever the vacuum in vacuum line 51 is reduced sufficiently by sufficient air by passing through alarm 50 past any of the three valve systems. Accordingly, a dual safety system is provided in which a sound alarm produces audible warnings while a warning light produces visual warning. It should be clear, of course, that one or the other warning systems might by used without the other, as might the hydraulic brake system be used without the power steering, or the power steering without the hydraulic brake system warnings, and, of course, other systems using fluids may be incorporated into the overall system. One such warning system that may be incorporated in the system is having the braking lights connected with the braking switch and the vacuum switch 52 being connected in parallel so that when the vehicle stalls or anytime the ignition is on without the motor running, the brake light comes on. Optional wires 63 are shown for this connection, if it is desired.

Figure 5:
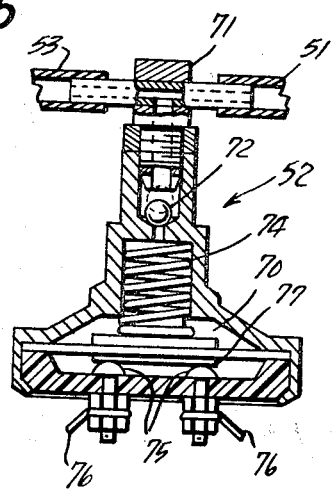
FIG. 5 shows a cutaway view of the vacuum switch.

FIG. 5 shows a cutaway view of the vacuum switch 52, which has a sealed vacuum chamber 70, inlet fitting 71 for connecting a vacuum line to a check ball valve 72. Ball 72 is inactivated by a sufficient vacuum being placed on the valve. However, when the vehicle throttle is opened suddenly the vacuum in the intake manifold and accordingly in the vacuum line is momentarily reduced. This would result in the vacuum switch being activated momentarily except for the ball which forms a temporary checking or holding of the vacuum in the chamber. A diaphragm 73 has a force applied against it in one direction be spring 74 and in the other direction by the vacuum in chamber 70. A copper plate 74 will close on two contacts 75 when the vacuum is reduced in chamber 70 thus allowing the flow of current through line 76.

From the foregoing description, it will be clear that a system has been provided for warning when hydraulic brake fluid or power steering fluid has reached a low level in the operation of various types of vehicles. It is to be understood, however, that the system as described has a wide range of applications, some of which have been described, but that other variations are contemplated as being within the spirit of the invention. For instance the linkage or connections between the float and the valve could be of other designs without departing from the scope of the present invention.

This invention is not to be construed as limited to the particular forms disclosed herein, since these are to be regarded as illustrative rather than restrictive.

I claim:

1. A safety signal apparatus for warning when vehicle fluid levels reach a predetermined level comprising in combination:
   a. signal means;
   b. float means adapted to float in a fluid reservoir;
   c. valve means having open and closed positions and linked to and operated by said float means;
   d. said valve means having a vacuum line attached to one side thereof and adapted to allow air into said vacuum line when said valve means is in said opened position and to prevent air from entering said vacuum line when in said closed position, said vacuum line also being coupled to a vacuum produced by the engine of said vehicle; and
   e. said signal means being operated by the intake of air into said vacuum line when said float means reaches a predetermined level thereby moving said valve means to its open position.

2. The apparatus according to claim 1 in which said signal means includes an audible signal actuated by the flow of air into said vacuum line.

3. The apparatus according to claim 2 in which said signal means includes a visual signal.

4. The apparatus according to claim 3 in which said float means has a guide means for guiding the rise and fall of said float.

5. The apparatus according to claim 4 in which two float means are adapted to float in each of said master brake cylinder fluid reservoirs in a dual action braking system and each said float having a valve means connected in series to said vacuum line.

6. The apparatus according to claim 5 in which a third float means is adapted to float in the power steering reservoirs with one said valve means for each float connected in series to said vacuum line.

7. The apparatus according to claim 6 in which a vacuum-operated switch is connected to said vacuum line and is adapted to electrically switch on said visual signal when the vacuum in said line is reduced to a predetermined level.

8. The apparatus according to claim 7 in which said vacuum switch has a checking means to prevent switching on said visual signal from momentary reductions in the vacuum in the vacuum line.

9. The apparatus according to claim 8 in which the brake lights of said vehicle are connected through said vacuum switch and in parallel with the braking lights braking switch, whereby said braking lights will be turned on by the loss of the vacuum in said vacuum line.